United States Patent
Kim et al.

(10) Patent No.: US 8,873,687 B2
(45) Date of Patent: Oct. 28, 2014

(54) DIGITAL FRONT END RECEIVER USING DC OFFSET COMPENSATION SCHEME

(75) Inventors: Sang-Kyun Kim, Gyeongsangbuk-do (KR); Ik Soo Eo, Daejeon (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 3 days.

(21) Appl. No.: 13/609,704

(22) Filed: Sep. 11, 2012

(65) Prior Publication Data

US 2013/0163699 A1      Jun. 27, 2013

(30) Foreign Application Priority Data

Dec. 27, 2011   (KR) .................... 10-2011-0143968

(51) Int. Cl.
*H04B 1/10*  (2006.01)
*H04B 1/00*  (2006.01)

(52) U.S. Cl.
CPC ............ *H04B 1/0017* (2013.01); *H04B 1/0021* (2013.01)
USPC ............................. 375/350; 375/319; 375/346

(58) Field of Classification Search
CPC .. H04B 1/1036; H04B 1/0017; H04B 1/0021; H03D 3/008
USPC .......................................... 375/319, 346–350
See application file for complete search history.

(56) References Cited

U.S. PATENT DOCUMENTS

| | | | |
|---|---|---|---|
| 6,389,069 B1 | 5/2002 | Mathe | |
| 7,170,956 B1 * | 1/2007 | Fong et al. | 375/344 |
| 7,251,298 B1 * | 7/2007 | Hietala et al. | 375/340 |
| 2009/0068974 A1 | 3/2009 | Smith | |
| 2012/0028594 A1 * | 2/2012 | Rao et al. | 455/207 |

OTHER PUBLICATIONS

Gernot Hueber et al., "Smart Front-End Signal Processing for Advanced Wireless Receivers", IEEE Journal of Selected Topics in Signal Processing, Jun. 2009, pp. 472-487, vol. 3, No. 3.

\* cited by examiner

*Primary Examiner* — Curtis Odom
(74) *Attorney, Agent, or Firm* — Rabin & Berdo, P.C.

(57) ABSTRACT

The present invention relates to a digital front end receiver using a DC offset compensation scheme. The digital front end receiver includes a DC offset compensation filter configured to remove DC offset components from signals received from a digital mixer and a Cascaded Integrator-Comb (CIC) decimation filter configured to reduce a sampling rate of the signals received from the DC offset compensation block.

4 Claims, 3 Drawing Sheets

DIGITAL FRONT END RECEIVER USING DC OFFSET COMPENSATION SCHEME

CROSS-REFERENCES TO RELATED APPLICATIONS

The present application claims priority under 35 U.S.C. 119(a) to Korean Application No. 10-2011-0143968, filed on Dec. 27, 2011, in the Korean Intellectual Property Office, which is incorporated herein by reference in its entirety set forth in full.

BACKGROUND

Exemplary embodiments of the present invention relate to a digital front end receiver using a DC offset compensation scheme, and more particularly, to a digital front end receiver using a DC offset compensation scheme in a mobile communication system supporting multiple channels and multiple bandwidths.

A Digital Front End (DFE) performs a function of enabling the digital modulation and demodulation of a Radio Frequency (RF) receiver by processing a signal before a baseband modem block from an Analog to Digital Converter (ADC) for processing a received RF input signal by using a digital or discrete signal.

A conventional DFE has flexibility capable of supporting multiple modes and multiple bands if it is embodied using digital logic.

A conventional DFE includes a decimator for changing a high output signal of an ADC into a signal of a low sampling frequency, a digital filter for removing noise other than signals, and a sampling rate converter for converting a signal into a signal of an accurate sampling rate necessary for a system standard. The conventional DFE may further include an Automatic Gain Control (AGC) function for enabling a signal to be operated within a proper range in a DFE block.

Furthermore, the conventional DFE has a Cascaded Integrator-Comb (CIC) decimation filter structure for applying a different filtering value and a different decimation rate to each of multiple frequency bandwidths. This CIC decimation filter structure is advantageous in that it does not have a multiplier and it performs a filtering operation without greatly increasing complexity even in a system supporting multiple bandwidths. The CIC decimation filter structure is also advantageous in that a CIC compensation filter and a channel selection filter placed in the rear stage of the DFE may filter a signal band effectively without increasing complexity. Furthermore, in order to handle a change of a CIC output signal, a new CIC decimation filter with which Digital AGC (DAGC) is combined may be configured.

The conventional DFE is problematic in that DC components included in input signals provided to the RF receiver deteriorate the bit efficiency of the DFE.

Furthermore, in a system supporting multiple modes and multiple bands, a DAGC block is used in order to maintain a signal to noise ratio by controlling a signal. In this case, there are problems in that it is difficult to amplify an input signal including a DC component into a signal of a desired level and the input signal may be distorted by the DAGC operation.

The background of the present invention is disclosed in U.S. Patent Laid-Open Publication No. 2009/0068974 (Mar. 12, 2009).

SUMMARY

An embodiment of the present invention relates to a DFE receiver using a DC offset compensation scheme, which is capable of supporting multiple modes and multiple bands and reducing an area and consumption power as compared with the existing analog method by implementing a DFE using digital logic so that the digital demodulation of an RF receiver is made possible.

Another embodiment of the present invention is to effectively support a system including various channel bands and various frequency bands by variably controlling a decimation rate having a multiple of an integer or a multiple of a real number depending on the band of a signal or a frequency bandwidth by using a CIC decimation filter and a resampler.

Yet another embodiment of the present invention is to support the efficient operation of DAGC and a filter placed in the rear stage of the DFE by previously compensating for a DC offset through a DC offset compensation filter placed in the front stage of the DFE.

Further yet another embodiment of the present invention is to solve a timing margin problem between a clock and a signal which may occur in a block that performs high-speed signal processing by performing a DC offset estimation operation in response to an enable signal slower than an operating clock.

In one embodiment, a digital front end receiver using a DC offset compensation scheme includes a DC offset compensation filter configured to remove DC offset components from signals received from a digital mixer and a CIC decimation filter configured to reduce the sampling rate of the signals received from the DC offset compensation block.

The DC offset compensation filter of the present invention calculates the average of the input signals for previously set N samples and estimates the DC offset components included in the input signals based on the calculated average.

The DC offset compensation filter of the present invention estimates the DC offset components in response to an enable signal enabled once for each m clock (wherein m is a natural number greater than 1) of a real operating clock.

The DC offset compensation filter of the present invention includes a counter configured to perform counts equal to the number of samples previously set in order to calculate the average of the input signals, an average calculator configured to accumulate the input signals equal to the set number of samples and calculate the average of the input signals through a bit truncation process, and an adder configured to subtract the calculated average of the average calculator from the input signal and generate an output value compensated DC offset component based on a result of the subtraction.

The CIC decimation filter of the present invention is a cascaded decimation filter configured to have sub-CIC filters arranged in a cascaded form according to bandwidths in order to support various frequency bandwidths and to select a relevant output value in response to a control signal.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Figure 1:
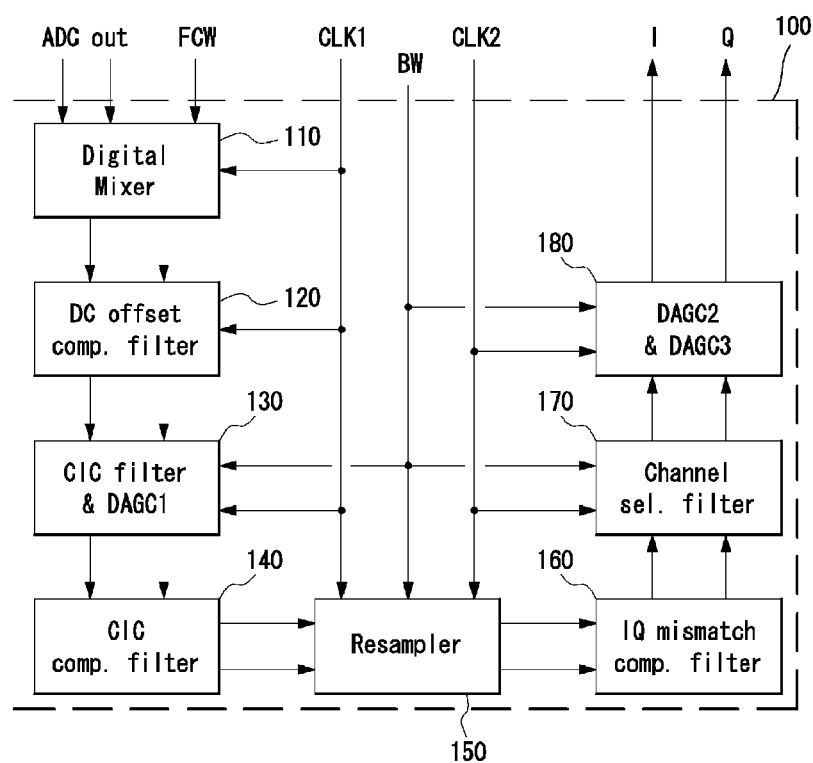
FIG. 1 is a diagram showing the structure of a DFE according to an embodiment of the present invention.

Hereinafter, a digital front end receiver using a DC offset compensation scheme according to an embodiment of the present invention will be described with reference to accompanying drawings. However, the embodiments are for illustrative purposes only and are not intended to limit the scope of the invention. In the specification, the thickness of lines or the size of elements shown in the drawings in this process may be enlarged for the clarity of a description and for the sake of convenience. Furthermore, terms to be described later are defined by taking functions in the present invention into consideration and may be different according to an operator's intention or usages. Accordingly, the terms should be defined based on the contents over the entire specification.

FIG. 1 is a diagram showing the structure of a DFE according to an embodiment of the present invention.

A DFE described in the present embodiment is to support multiple channel bands in a mobile communication system and may be applied to all systems which support multiple modes and/or multiple bands. The DFE has a structure in which the function of the existing RF analog block is replaced with digital signal processing and uses a signal having a high-speed sampling rate as its input.

An RF input signal is inputted to a DFE 100 via a Low Noise Amplifier (LNA) and an Analog to Digital Converter (ADC).

The DFE according to the present embodiment is described in short. The DFE 100 may include a digital mixer for dropping the center frequency of an input signal to DC, a decimator for changing an ADC output signal having a high sampling frequency into a low sampling frequency that maintains received data, but has a low baseband signal, a digital filter for removing noise, and a sampling rate converter for converting the input signal into a signal having a precise sampling rate necessary for a modem when the sampling rate of the input signal and a sampling rate necessary for the modem are not a multiple of an integer. The DFE 100 further includes DAGC for handling a change in the amount of a signal which is generated owing to an interference signal.

As will be described below, the DFE 100 uses a first clock CLK1 having the same clock rate as the sampling clock of ADC output and a second clock CLK2 having the same clock rate as that of the modem. The DFE 100 further uses a control signal BW flexibly operated in several bands.

Referring to FIG. 1 showing the construction of the DFE 100, the DFE 100 may include a digital mixer 110, a DC offset compensation filter 120, a CIC decimation filter and first Digital Automatic Gain Control (DAGC1) unit 130, a CIC compensation filter 140, a resampler 150, an IQ mismatch compensation filter 160, a channel selection filter 170, and a second DAGC2 and third DAGC3 unit 180.

The digital mixer 110 performs a function of receiving ADC output as its input signal and dropping the center frequency of the input signal to DC. Here, the digital mixer 110 also changes the frequency of the input signal based on a received Frequency Control Word (FCW).

The DC offset compensation filter 120 may be a block for processing a signal having the fastest speed within the DFE 100. The DC offset compensation filter 120 performs a function of estimating and removing a DC offset component that may exist in the input signal owing to a receiver and noise. The DC offset compensation filter 120 according to the present embodiment may estimate a DC component included in a signal by using a simple method of calculating an average for N samples of the input signal, for example, as will be described later.

The CIC decimation filter of the CIC decimation filter and DAGC1 unit 130 is a part for receiving an output value of the DC offset compensation filter 120 and processing the received output value. The CIC decimation filter, together with the DC offset compensation filter 120, may be a block for processing a signal having the fastest speed within the DFE 100.

The CIC decimation filter functions to lower the sampling rate of the input signal in order to prevent subsequent blocks within the DFE 100 from processing a signal as a signal having a high oversampling ratio.

In the present embodiment, a cascaded decimation filter configured to have sub-CIC filters arranged in a cascaded form according to bandwidths in order to support various frequency bandwidths using minimum hardware resources and to select a desired output value in response to the control signal BW may be used as the CIC decimation filter.

Furthermore, the DAGC1 unit is included in the CIC decimation filter and DAGC1 unit 130 in order to search for the valid bits of filter output corresponding to a change in the amount of a signal which is generated for each band or owing to an interference signal.

The CIC compensation filter 140 performs a function of correcting the distortion of a signal generated in the CIC decimation filter of the CIC decimation filter and DAGC1 unit 130. The CIC decimation filter using a cascaded decimation scheme has the same filter characteristics, and thus the CIC compensation filter 140 can support multiple bands using one filter coefficient.

The resampler 150 functions to convert the data rate of ADC into the clock rate of a reception modem.

In general, a decimation filter has a decimation function of a multiple of an integer, whereas the resampler 150 according to the present embodiment performs a decimation function of a multiple of a real number. Furthermore, the resampler 150 according to the present embodiment effectively estimates an output signal from an input signal by using a small number of taps and a Farrow filter employing Lagrange Interpolator Polynomial. If the sampling rate of an input signal is made constant through the signal processing process of the resampler 150, multiple bands can be supported.

The IQ mismatch compensation filter 160 performs a function of compensating for the distortion of an I channel signal and a Q channel signal and the deterioration of an image rejection ratio which may be generated when the I channel and the Q channel of a digital RF receiver have different characteristics.

The channel selection filter 170 performs very sudden filtering at the corner of a channel frequency band and functions to remove noise other than signal bands. The channel selection filter 170 according to the present embodiment can reduce the size of hardware because it may be implemented using one filter coefficient when the sampling rate has the same ratio as a frequency bandwidth even in a system supporting multiple modes and multiple bands through the CIC decimation filter and the resampler 150 placed in the front stage of the DFE.

The DAGC2 and DAGC3 unit 180 is a block for matching the size of a signal. More particularly, the DAGC2 unit is a block for searching for valid bits of filter output corresponding to a change in the size of a signal which is generated after the signal passes through the channel selection filter 170. The DAGC3 unit automatically applies a gain in order to match the size of a signal inputted to the modem.

Figure 2:
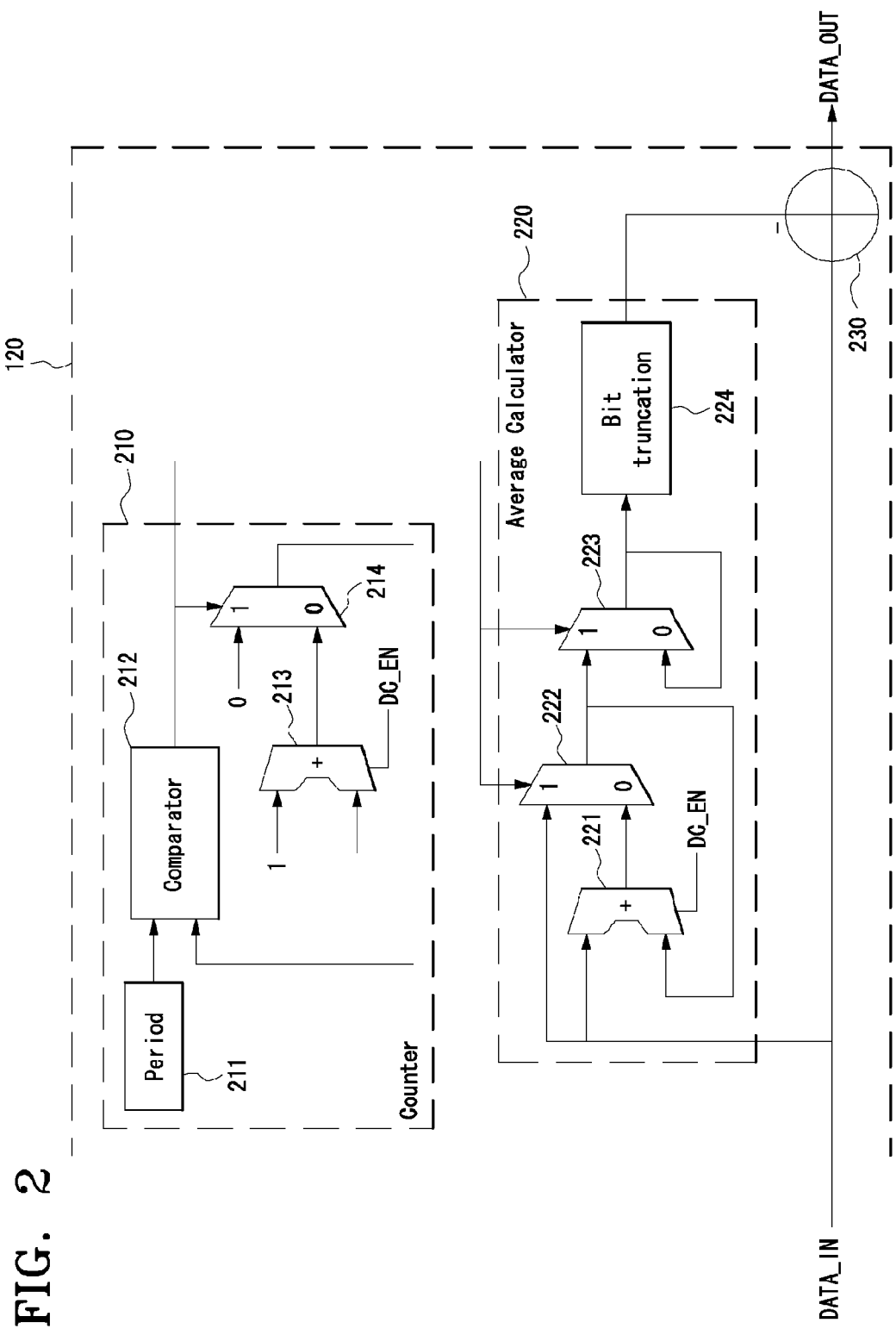
FIG. 2 is a diagram showing the structure of a DC offset compensation filter according to an embodiment of the present invention.

FIG. 2 is a diagram showing the structure of a DC offset compensation filter according to an embodiment of the present invention.

The DC offset compensation filter 120 needs to be embodied in a simple structure because a signal inputted to the DC offset compensation filter 120 is the fastest signal within the DFE and a signal processing operation process is performed at the fastest speed.

Accordingly, the DC offset compensation filter 120 according to the present embodiment may estimate DC offset components included in input signals by using a simple method of calculating the average of the input signals for the set number of samples as shown in, for example, Equation 1 below.

$$\text{estimated DC offset} = \frac{1}{N} \sum_{k=s}^{s+N-1} r(k) \quad \text{[Equation 1]}$$

In Equation 1, N indicates the number of samples set in order to calculate an average. The DC offset compensation filter 120 calculates the average of the input signals equal to the set number of samples N and estimates DC components included in the input signals based on the calculated average.

The DC offset compensation filter 120 is operated according to a simple equation, such as Equation 1, but there is a possibility that a timing margin problem may occur between a clock and a signal in an operation process of calculating DC offset components because the fastest signal is operated in the DC offset compensation filter 120 within the DFE.

In order to solve this problem, an enable signal operated once per two clocks may be generated so that the DC offset estimation operation is performed in response to the enable signal. This has the same effect that the DC offset estimation operation is performed at a clock twice slower than a real operating clock. Therefore, the timing margin problem in the DC offset compensation filter 120 can be solved.

The DC offset compensation filter 120 according to the present embodiment is described in detail below with reference to FIG. 2.

Referring to FIG. 2, the DC offset compensation filter 120 includes a counter 210 for performing counts equal to the set number of samples in order to calculate the average of input signals and an average calculator 220 for accumulating input signals equal to the set number of samples and calculating the average of the input signals through a bit truncation process.

The counter 210 includes the set number of samples 211, a comparator 212, an adder 213, and a multiplexer MUX 214. The comparator 212 compares the set number of samples 211 with a result of the MUX 214. If, as a result of the comparison, the set number of samples 211 is equal to the result of the MUX 214, the comparator 212 outputs 1. If, as a result of the comparison, the set number of samples 211 is not equal to the result of the MUX 214, the comparator 212 outputs 0. The adder 213 accumulates a value by adding 1 to the value whenever a value of an enable signal DC_EN becomes 1. The MUX 214 outputs a result of the adder 213 or 0 depending on an output value of the comparator 212, and the result of the adder 213 or 0 is inputted to the adder 213 and the comparator 212.

The average calculator 220 includes an adder 221, a first MUX 222, a second MUX 223, and a bit truncation unit 224.

The adder 221 receives an input signal DATA_IN and an output value of the first MUX 222 and performs addition when the enable signal DC_EN is 1. The first MUX 222 and the second MUX 223 select a value depending on an output value of the counter 210 and outputs the selected value.

The first MUX 222 accumulates input signals equal to the set number of samples. The first MUX 222 outputs an accumulated signal, that is, an output value of the adder 221 when an output value of the counter 210 is 0 and outputs the input signal DATA_IN when an output value of the counter 210 is 1.

The second MUX 223 outputs an accumulated signal newly calculated per set number of samples. The second MUX 223 outputs an output value of the first MUX 222 when an output value of the counter 210 is 1 and outputs a previous result when an output value of the counter 210 is 0. The bit truncation unit 224 selects a result of the second MUX 223, that is, an accumulated result of the input signals, by set bits and outputs the selected value. The outputted value becomes an estimated DC offset value. An adder 230 compensates for a DC offset component included in the input signal DATA_IN by subtracting an output value of the average calculator 220 from the input signal DATA_IN.

In FIG. 2, the enable signal DC_EN inputted to the adders 213 and 221 is a signal generated in order to solve a timing margin problem between a clock and a signal in the DC offset compensation filter 120 operated at a high speed clock. The enable signal DC_EN according to the present embodiment is illustrated as being operated once per two clocks. What the enable signal DC_EN will be operated once per several clocks may be controlled depending on an operating clock of a system and the degree of a timing margin thereof.

If an operation is performed in response to the enable signal DC_EN, a timing margin problem between a clock and a signal can be solve because the same effect as that the operation is performed at a clock twice slower than a real operating clock is obtained.

Figure 3:
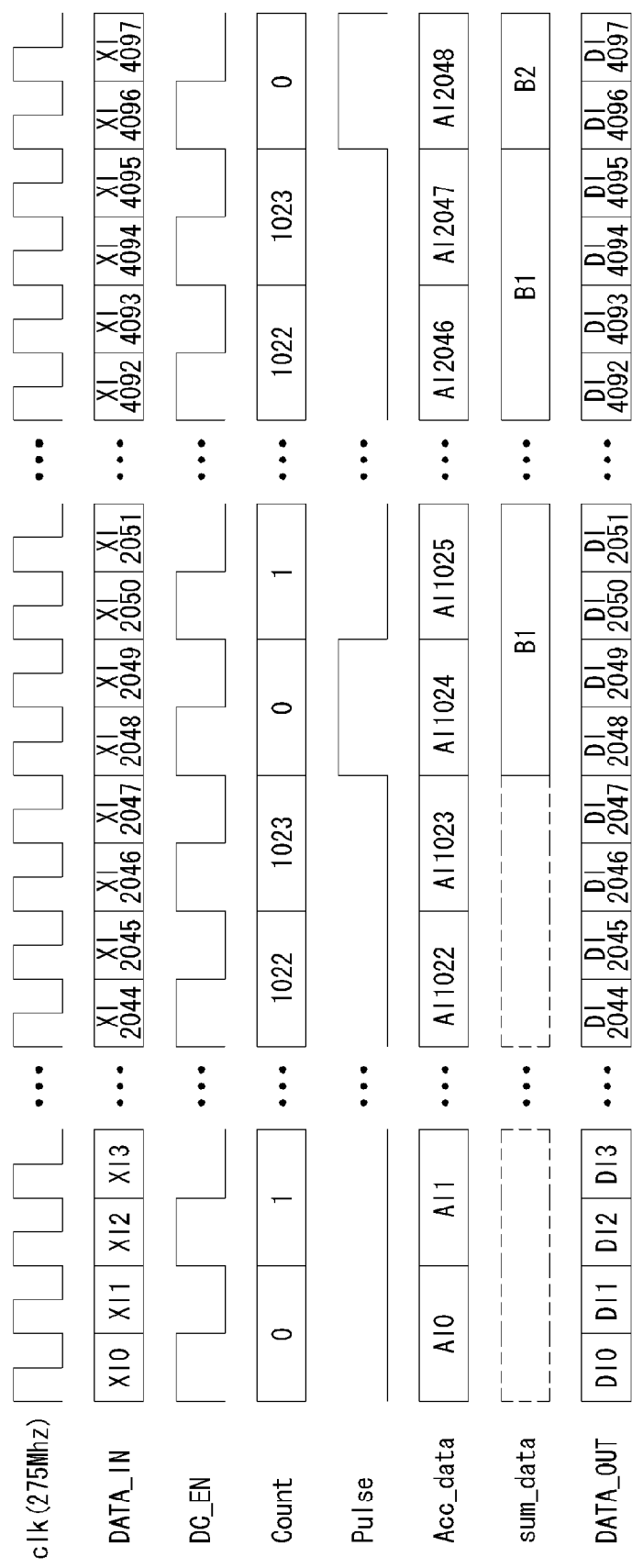
FIG. 3 is a timing diagram illustrating the DC offset compensation filter in the DFE according to an embodiment of the present invention.

FIG. 3 is a timing diagram illustrating the DC offset compensation filter 120 in the DFE according to an embodiment of the present invention.

It is assumed that a clock used in the DC offset compensation filter 120 is, for example, 275 MHz and the number of samples N set to calculate an average, for example, 1024, for convenience of description.

In FIG. 3, DC_EN is the enable signal used for a timing margin between a clock and a signal, and Count is a result of the adder 213 calculated in the counter 210 of FIG. 2. Furthermore, Pulse is an output value of the comparator 212 of the counter 210 of FIG. 2. The operation of the average calculator 220 is performed in response to the pulse signal.

Acc_data is an output value of the first MUX 222 of the average calculator 220, and it corresponds to an accumulated value of input signals equal to the set number of samples N. sum_data is an output value of the bit truncation unit 224 of the average calculator 220 and a value of DC components included in input signals which has been estimated by calculating the average of N signals.

As shown in FIG. 3, update is performed once per N samples, and DATA_OUT obtained by subtracting the output value sum_data from the input signal DATA_IN is outputted as an output value.

The present invention can support multiple modes and multiple bands and reduce an area and consumption power as compared with the existing analog method by implementing the DFE using digital logic so that the digital demodulation of an RF receiver is made possible.

The present invention can effectively support a system including various channel bands and various frequency bands by variably controlling a decimation rate having a multiple of an integer or a multiple of a real number depending on the band of a signal or a frequency bandwidth by using the CIC decimation filter and the resampler.

The present invention can support the efficient operation of DAGC and a filter placed in the rear stage of the DFE by previously compensating for a DC offset through the DC offset compensation filter placed in the front stage of the DFE.

The present invention can solve a timing margin problem between a clock and a signal which may occur in a block that performs high-speed signal processing by performing a DC offset estimation operation in response to an enable signal slower than an operating clock.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A digital front end receiver using a DC offset compensation scheme, comprising:
   a DC offset compensation filter configured to remove DC offset components from signals received from a digital mixer; and
   a Cascaded Integrator-Comb (CIC) decimation filter configured to reduce a sampling rate of the signals received from the DC offset compensation filter,
   wherein the DC offset compensation filter calculates an average of the input signals for previously set N samples and estimates the DC offset components included in the input signals based on the calculated average, and
   wherein the DC offset compensation filter estimates the DC offset components in response to an enable signal enabled once for each m clock (wherein m is a natural number greater than 1) of a real operating clock.

2. The digital front end receiver of claim 1, wherein the CIC decimation filter is a cascaded decimation filter configured to have sub-CIC filters arranged in a cascaded form according to bandwidths in order to support various frequency bandwidths and to select a relevant output value in response to a control signal BW.

3. A digital front end receiver using a DC offset compensation scheme, comprising:
   a DC offset compensation filter configured to remove DC offset components from signals received from a digital mixer; and
   a Cascaded Integrator-Comb (CIC) decimation filter configured to reduce a sampling rate of the signals received from the DC offset compensation filter,
   wherein the DC offset compensation filter calculates an average of the input signals for previously set N samples and estimates the DC offset components included in the input signals based on the calculated average, and
   wherein the DC offset compensation filter comprises:
      a counter configured to perform counts equal to a number of samples previously set in order to calculate the average of the input signals;
      an average calculator configured to accumulate the input signals equal to the set number of samples and calculate the average of the input signals through a bit truncation process; and
      an adder configured to subtract the calculated average of the average calculator from the input signal and generate an output value compensated DC offset component based on a result of the subtraction.

4. The digital front end receiver of claim 3, wherein the CIC decimation filter is a cascaded decimation filter configured to have sub-CIC filters arranged in a cascaded form according to bandwidths in order to support various frequency bandwidths and to select a relevant output value in response to a control signal BW.

* * * * *